(12) United States Patent
Sann et al.

(10) Patent No.: US 9,884,274 B2
(45) Date of Patent: Feb. 6, 2018

(54) FILTER APPARATUS

(75) Inventors: Norbert Sann, Riegelsberg (DE); Martin Braune, Fechingen (DE)

(73) Assignee: HYDAC FILTER TECHNIK GMBH, Sulzbach/SAAR (DE)

( * ) Notice: Subject to any disclaimer, the term of this patent is extended or adjusted under 35 U.S.C. 154(b) by 628 days.

(21) Appl. No.: 13/261,783

(22) PCT Filed: Mar. 15, 2012

(86) PCT No.: PCT/EP2012/001154
§ 371 (c)(1),
(2), (4) Date: Nov. 20, 2013

(87) PCT Pub. No.: WO2013/000523
PCT Pub. Date: Jan. 3, 2013

(65) Prior Publication Data
US 2014/0083923 A1    Mar. 27, 2014

(30) Foreign Application Priority Data
Jun. 25, 2011 (DE) .................. 10 2011 105 555

(51) Int. Cl.
*B01D 29/13* (2006.01)
*B01D 29/21* (2006.01)
*B01D 29/96* (2006.01)

(52) U.S. Cl.
CPC ............. *B01D 29/13* (2013.01); *B01D 29/21* (2013.01); *B01D 29/96* (2013.01); *B01D 2201/296* (2013.01); *B01D 2201/4061* (2013.01)

(58) Field of Classification Search
CPC .............................................. B01D 2201/4061
See application file for complete search history.

(56) References Cited

U.S. PATENT DOCUMENTS

| 2,693,281 A | 3/1950 | Winzen |
| 5,660,727 A * | 8/1997 | Gleave ............... B01D 11/0203 210/141 |
| 8,840,787 B2 * | 9/2014 | Sann .................. B01D 35/0276 210/130 |
| 2002/0144937 A1 | 10/2002 | Wilberscheid et al. |
| 2006/0054547 A1 | 3/2006 | Richmond et al. |
| 2010/0025317 A1 | 2/2010 | Fall et al. |

FOREIGN PATENT DOCUMENTS

| EP | 0 692 292 A1 | 1/1996 |
| WO | WO 02/089949 A1 | 11/2002 |
| WO | WO 2008/086304 A1 | 7/2008 |

(Continued)

*Primary Examiner* — Patrick Orme
(74) *Attorney, Agent, or Firm* — Wenderoth, Lind & Ponack, L.L.P.

(57) ABSTRACT

A filter apparatus has a filter housing (1) accommodating at least one filter element (17) having an inner filter cavity (23) enclosed by a filter medium (27). The housing (1) contains an element holder (19) that interacts with the filter element (17) located in its functional position. The element holder (19) has a projecting accommodating part (43) with an outer configuration adapted to the shape of an opening (37) located at the end of the filter element (17) to be secured to the element holder (19). The accommodating part (43) fits through the opening (37) of the filter element (17) located in the functional position.

20 Claims, 4 Drawing Sheets

(56) References Cited

FOREIGN PATENT DOCUMENTS

| WO | WO 2010/056711 A2 | 5/2010 | | |
|----|-------------------|--------|---|---|
| WO | WO 2010/102690 A1 | 9/2010 | | |
| WO | WO 2010102690 A1 * | 9/2010 | ......... | B01D 35/0276 |
| WO | WO 2011/047754 A1 | 4/2011 | | |

* cited by examiner

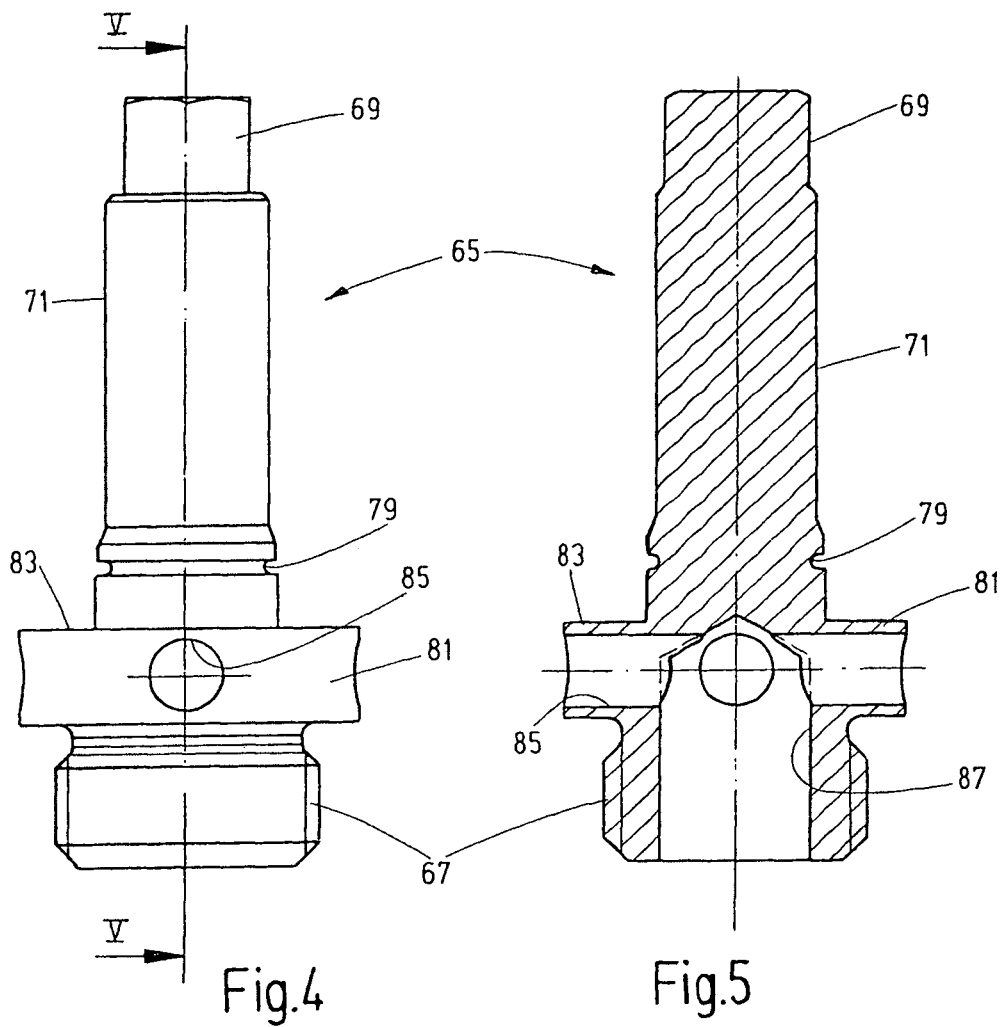

FILTER APPARATUS

FIELD OF THE INVENTION

The invention relates to a filter apparatus having a filter housing that accommodates at least one filter element having an inner filter cavity enclosed by a filter medium. The housing contains an element holder that interacts with the filter element, when the filter element is in the functional position. The invention further relates to a filter element that is provided for use inside such a filter apparatus.

BACKGROUND OF THE INVENTION

Filter devices of this kind are known from the prior art. They are widely used in configurations varying in terms of the structural type, size and/or pressure level thereof, for the filtration of the most varied technical fluids, such as hydraulic fluids, cooling lubricants, fuels, lubricating oils, and the like. Since operating disturbances, which disturbances can range as far as to failure of such filter devices, are potentially responsible for damaging or destroying the systems downstream of where the damage occurred and can cause considerable financial damage, the operational reliability of such filter devices is of great importance. Therefore, when operating such filter devices, it must be ensured that, on the one hand, the filtration process is performed using a filter element that is in the ready state and disposed inside the filter housing and, on the other hand, that the specifications of a filter element that is used in this process are precisely matched to the operational requirements of the associated system with regard to the quality of the filter, assignment to the corresponding pressure level, flow resistance and the like.

SUMMARY OF THE INVENTION

An object of the present invention to provide an improved filter apparatus with increased reliability to protect against malfunctions during the filtering process.

According to the invention, this object is basically achieved with a filter apparatus including, as an essential special aspect of the invention, an element holder provided inside the filter housing and including a projecting accommodating part for securing the respective filter element. The exterior shape of the projecting accommodating part is adapted to the shape of an opening disposed on the end of the related filter element that must be secured on the accommodating part of the element. The accommodating part then fits through the opening of the filter element, when the filter element is in the functional position. This way, only such filter elements are ensured to be brought in the functional position inside the filter housing that allow for the appropriate projecting accommodating part, which accommodating part is matched to the shape of the element holder, to fit through the opening. This way, the risk of using filter elements that are not compliant with the specifications in terms of the filter quality, the permissible pressure level and the like, can be avoided, thereby providing better operational reliability.

In especially advantageous embodiments, the accommodating part of the element holder is disposed such that it extends, when the related filter element is in the functional position thereof, into an accommodating space that is disposed on an allocated end cap and reaches into the inner filter cavity. With this structural design, it is ensured that, were an attempt made at inserting a wrong filter element, a filter element that does not have an accommodating space at the element holder thereof for the accommodating part that extends into the interior of the filter cavity, the insertion movement of the filter element would be blocked prior to reaching the functional position in that the accommodating part would be stopped, and thereby blocked, by the end cap. Thus the operator is provided with a clear signal that insertion of the "wrong" filter element is being attempted.

Preferably, the accommodating part, provided for the engagement in the opening of the accommodating space of the filter element, has a shape that is not round.

In especially preferred embodiments, the accommodating part can be configured in the manner of a spike, and the accommodating space on the element holder can be configured in the manner of a dome.

Especially advantageously, the chosen apparatus can provide that the spike has planar surface portions along the circumference thereof that define a cross section that has the shape of four straight sides that are inscribed in a square. The size of the cross section of the spike becomes smaller toward the top, free end thereof. Due to the slender, free end of the spike, achieving the engagement with the dome is especially easy and convenient.

The non-round shape of the spike having planar surface portions along the circumference thereof and the corresponding non-round shape of the opening of the accommodating dome require a corresponding relative rotational position between the filter element and the spike to engage in the accommodating dome. Especially preferred embodiments rotatably support the spike on a shaft disposed on the element holder extending into a central bore of the dome. When combining the accommodating dome and the spike, the spike positions itself automatically by the more slender free end in the rotary position that is necessary for the combining action.

In especially advantageous embodiments, the shaft has a collar that secures the spike, against, against any axial movement that is directed away from the respective filter element.

To protect against any lifting action of the spike from the shaft in the other direction, a snap ring is provided on the shaft. The snap ring acts in conjunction with a groove disposed in the central bore of the spike, thereby axially securing the spike.

The shaft can be screwed into a sealable oil discharge opening of the filter housing, producing an especially simple and compact structural assembly.

For the oil discharge opening to be able to fulfill its discharge function despite the shaft, which is screwed thereto, the apparatus can be especially advantageously provided with an internal fluid path between the exterior of the collar and the discharge opening of the housing. Even when the shaft is screwed in, opening a discharge screw on the discharge opening will then allow for a discharge to occur.

Another object of the present invention seeks to provide a filter element for use in that filter apparatus, wherein the filter element has the appropriate characteristics described above.

Further configurations of the filter element are also set forth hereinafter.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure:

FIG. 4 is a side view of a shaft of the element holder of FIG. 3;

FIG. 5 is a side view in section of the shaft of FIG. 4;

DETAILED DESCRIPTION OF THE INVENTION

Figure 1:
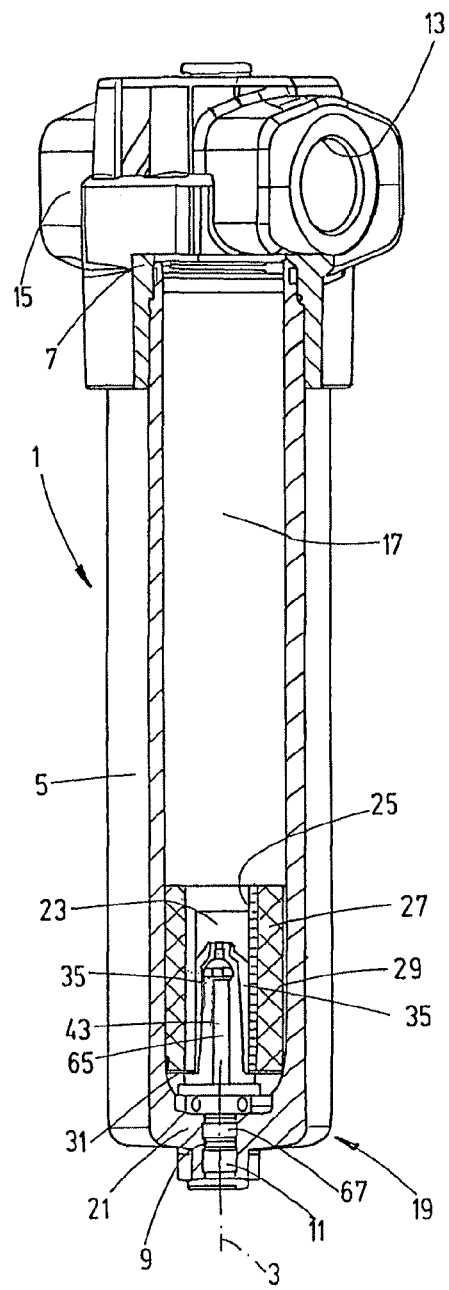
FIG. 1 is a perspective view, partially in section of a filter apparatus according to an exemplary embodiment of the invention.

FIG. 1 shows an embodiment of the filter apparatus according to the invention that is provided for the filtration of pressurized fluids. The filter housing 1, which defines a vertical axis 3, includes a cylindrical main part 5 that has a head part 7 screwed to the top end thereof. At the bottom end, the main part 5 is closed, except for a discharge opening 9, and a discharge screw 11 is screwed into the internal thread of the discharge opening. The top head part 7 includes a connection inlet 13 for inflowing unfiltered fluid and a connection or outlet 15 for the filtrate out flow. Fluid paths that are disposed within the head part 7 and that correspond to the pertinent prior art, are not depicted in further detail, and connect the connection 13 and 15 to the untreated side and the clean side of the respective filter element 17 retained inside the housing 1. A bypass device inside the head part 7 creates a secondary closure, if necessary, also corresponding to the prior art.

The filter housing 1 is cut open in the drawing along the longitudinal axis 3 such that the exterior of the filter element 17 is visible. The same is also depicted as cut open in a bottom longitudinal section, by which the filter element 17 is mounted in an element holder 19 on the floor 21 of the filter housing 1. This drawing opens up a view to the inside upon the filter cavity 23 that is coaxially disposed relative to the vertical axis 3 and surrounded by a fluid-permeable support pipe 25. In turn, a filter medium 27 that constitutes a hollow cylinder is disposed on hollow pipe 25. During the filtration process, the filter medium receives the flow-through from the exterior, which constitutes the untreated side 29, toward the filter cavity 23, which constitutes the clean side.

The element holder 19 of the filter housing 1 that serves to secure the filter element 17 in its functional position, as shown in FIG. 1, and interacts with an end cap 31 of the filter element 17 as shown more clearly from FIGS. 3 to 9. The end cap 31 includes a projecting rim 33, as known from the prior art, that is allocated to the end region of the filter medium 27 framing the same. An essential difference in contrast to common end caps presently lies in the fact that the end cap 31 includes a body provided as a component fashioned in one piece therewith. That body is centrally disposed, extends along the vertical axis 3 into the interior of the filter element 17, has the shape of an inverted goblet or a dome 35 and is tapered from the end-side opening 37 thereof (see particularly FIG. 8) toward the internal end. The dome 35 then constitutes an internal accommodating space 39 in the manner of a sleeve, which is also tapered toward the internal end. An opening of the accommodating space 39 that is disposed at the internal end can be sealed by a screw 41. Instead of the screw 41, the use of a plug, preferably manufactured of a sintered metal, is also possible, which can be driven into the corresponding opening. The sintered metal material has a certain degree of porousness, whereby a pressure equalization is possible with the closure plug placed on the filter element, while also achieving a kind of a small filter that is able, when it is disposed inside the filter, to separate even the finest particle impurities. To this end, the closure screw 41 could also be made of a sintered metal material with a predefinable porousness.

The element holder 19 includes an accommodating part in the shape of a spike 43 accommodated inside the accommodating space 39 of the dome 35, when the filter element 17 is in its functional position. As can be derived from FIGS. 3, 6 and 7, the spike 43 has a non-round shape, wherein planar surface parts 45 are provided along or about the circumference of the spike 43 in the longitudinal section that engages in the accommodating space 39. A cross section of the spike 43 then has four straight edges 47 inscribed inside a square, see FIG. 7. These planar surface parts 45 converge toward the end 49 in a manner that corresponds to the tapering of the accommodating space 39. When the spike 43 is accommodated inside the accommodating space 39, the interior surfaces 51 of the dome 35 then fit against the planar surface parts 45 of the spike 43. The longitudinal ribs 53 (not all of which are identified by reference numerals in the drawings) extend along the exterior of the dome 35, and are disposed with a spacing there between, ranging from a collar 55, which is provided as a stop for the support pipe 25, toward the internal end of the dome 35.

Figure 3:
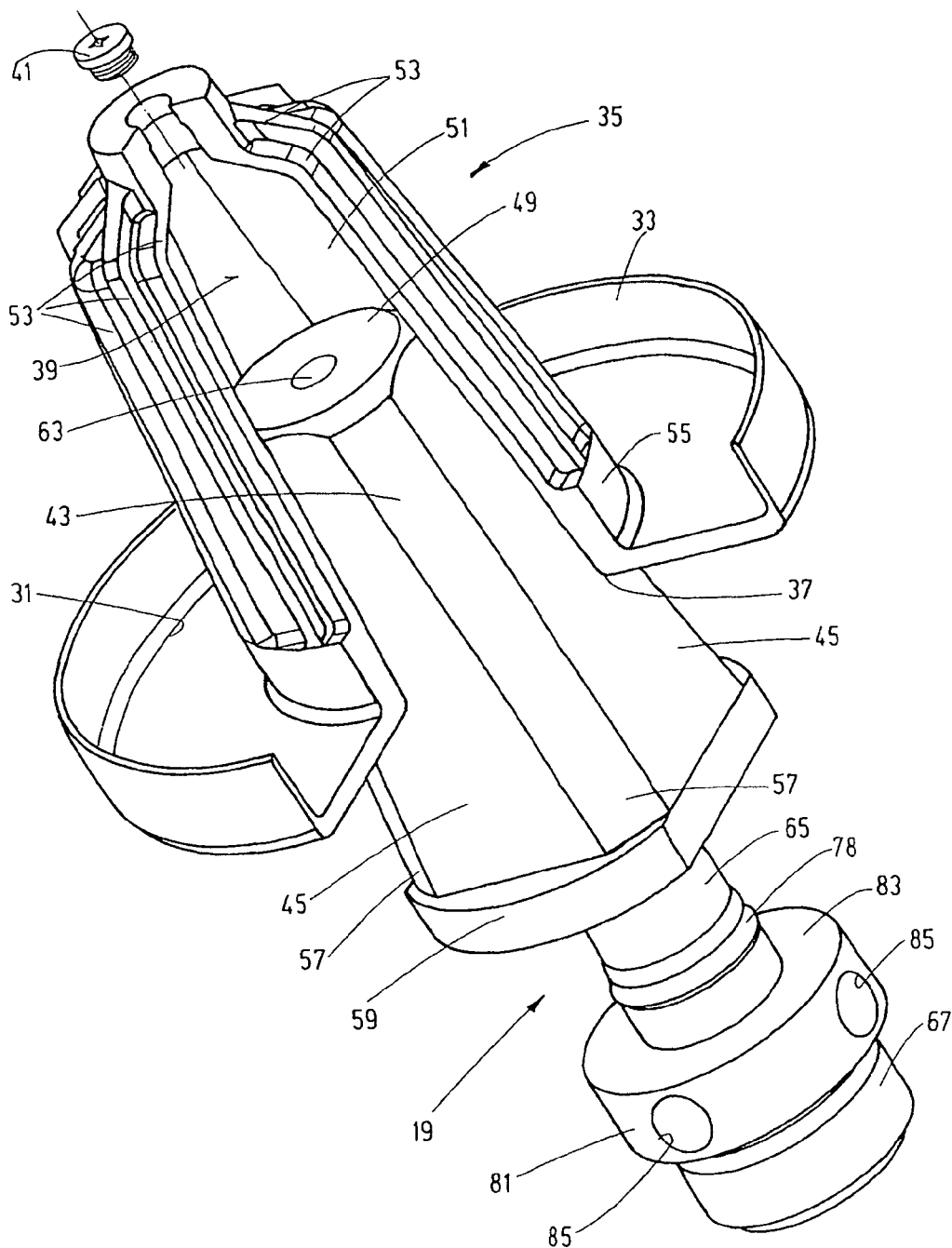
FIG. 3 is a greatly enlarged, exploded perspective view showing only the end cap of the filter element and the element holder of the filter housing of FIG. 1.
Figure 6:
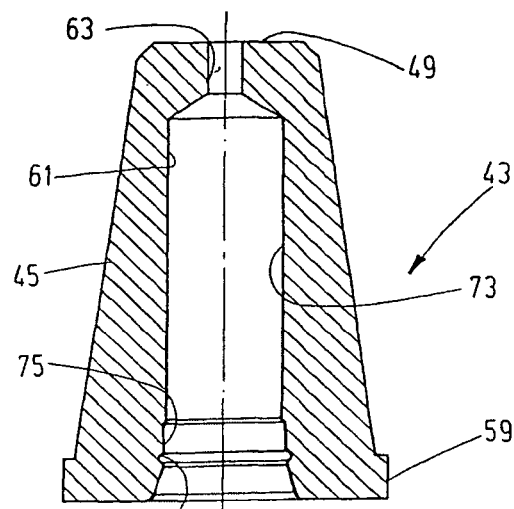
FIG. 6 is a side view in section of only one spike serving as the accommodating part for the element holder of FIG. 3.
Figure 7:
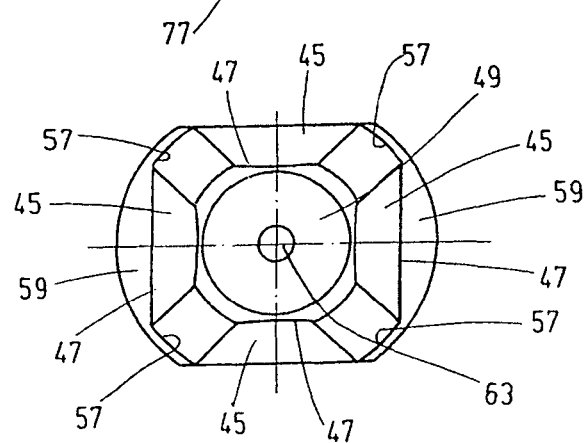
FIG. 7 is a top view of the spike of FIG. 6.
Figure 8:
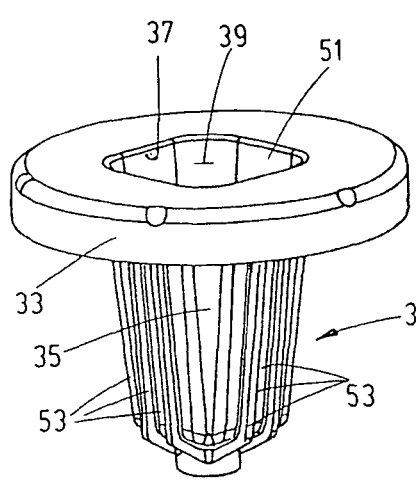
FIG. 8 is a bottom perspective view of only the end cap of the filter element of FIG. 1.
Figure 9:
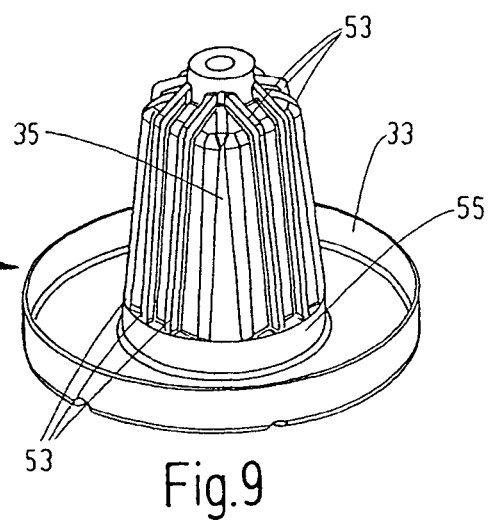
FIG. 9 is a top perspective view of the end cap of FIG. 8.

As can be derived from FIGS. 3, 6 and 7, the spike 43 includes rounded connecting surfaces 57 between the planar surface parts 45, as well as radially projecting flange parts 59 on two opposing sides. A central bore 61 extends inside the spike 43 from the thicker bottom end thereof to a compensation bore 63 on the tapered top end 49. The spike 43 is rotatably supported by the central bore 61 thereof on a shaft 65 of the element holder 19. This rotatable support of the spike 43 facilitates moving the non-round spike 43 into the accommodating space 39 of the dome 35, when the filter element 17 is inserted into the filter housing 1. Due to the tapered shape of the spike 43, the spike 43 adjusts itself automatically to the appropriate rotational position when moving into the dome. The shaft 65 includes an external thread 67 on the bottom end thereof, by which it is screwed into the internal thread of the discharge opening 9 of the filter housing 1. A hexagonal insert bit 69 is provided for the screwing action on the top end of the shaft 65. Following the hexagonal insert bit 69 is a circular cylindrical longitudinal section 71 by which the shaft 65 is rotatably supported, fitted in a supporting section 73 of the central bore 61 of the spike 43. The bore 61 includes, as can be seen in FIG. 6, an extension 75 at the bottom end thereof with a groove 77 configured therein. The groove interacts with a snap ring 78 (only indicated in FIG. 3) disposed in a groove 79 of the shaft 65 to protect against any axial movement of the spike 43 in the removal direction from the spike shaft 65. In this regard, the shaft 65 constitutes, together with the spike 43, a structural unit in two parts.

Below the snap ring 78 disposed inside the groove 79, the shaft 65 includes a collar 81 that constitutes a radial extension. Collar 81 forms a stop surface 83 for securing the spike 43 against any axial downward movement and includes a fluid connection 87 that is disposed between opening 85 on the exterior thereof and the bottom end that can be screwed into the discharge opening 9 of the housing 1. Fluid connection 87 allows for emptying the housing 1, after the discharge screw 11 has been removed.

Figure 2:
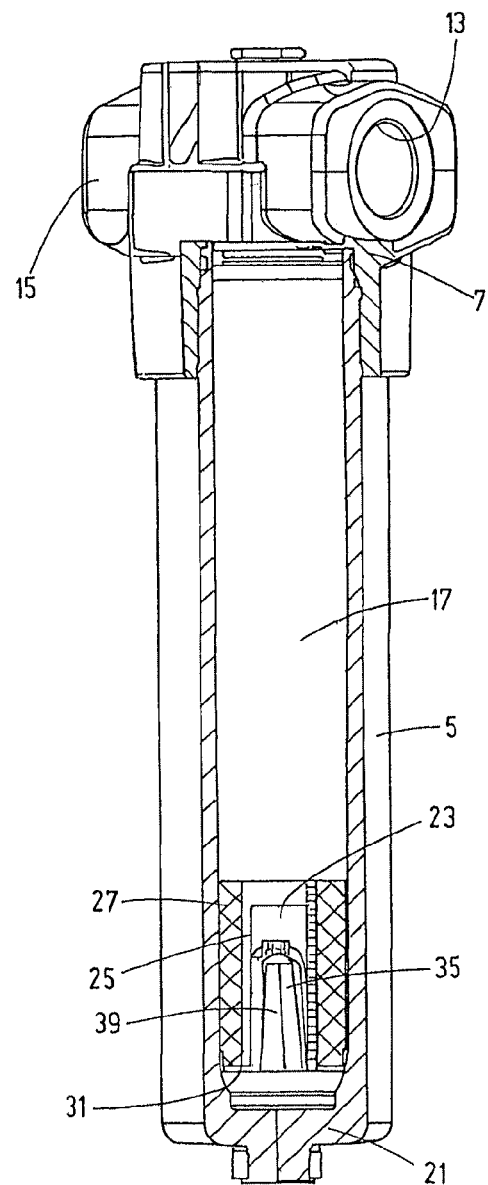
FIG. 2 is a perspective view of the filter element of FIG. 1 installed inside a filter housing of a common structural type.

FIG. 2 depicts a situation where a filter element 17 according to the invention is provided with an end cap 31 having a dome 35 for forming an accommodating space 39 for a spike 43, as is present as an element holder of a filter apparatus according to the invention, and is in its functional position. However, contrary to FIG. 1, in the representation in FIG. 2, the filter element 17 is not inserted into a filter housing 1 according to the invention. Instead, it is inserted in a filter housing of a common structural type, which includes a closed floor part 21 without an element holder with a projecting accommodating part in form of a spike disposed thereupon. Therefore, as depicted in FIG. 2, the filter element 17 that is configured according to the invention can also be inserted and brought into the functional position inside such a common filter housing.

In the present embodiment, the element holder 19 is made of steel parts in form of a spike 43 and shaft 65. Preferably, the end cap 31 of the filter element 17 is a die-cast part made of an aluminum/zinc alloy. Alternately, the end cap 31 could also be die-cast from a plastic material.

While various embodiments have been chosen to illustrate the invention, it will be understood by those skilled in the art that various changes and modifications can be made therein without departing from the scope of the invention as defined in the claims.

The invention claimed is:

1. A filter apparatus, comprising;
a filter housing having a longitudinal axis;
a filter element having a longitudinal axis, having an inner filter cavity enclosed by a filter medium and being received in said filter housing, said filter element having an opening at an end of said filter element and having a dome extending into said inner cavity, said dome having an accommodating space therein extending from said opening; and
an element holder being in said filter housing and interacting with said filter element when said filter element is in a functional position thereof in said filter housing, said element holder having a projecting accommodating spike with an outer configuration conforming to a shape of said opening and said accommodating space and being received in said opening and said accommodating space securing said filter element to said element holder when said filter element is in the functional position thereof, said spike being rotatably supported in said filter housing about said longitudinal axis on a shaft disposed on said element holder, said shaft extending into a central bore of said spike.

2. A filter apparatus according to claim 1 wherein said dome is disposed on an end cap on an end of said filter element.

3. A filter apparatus according to claim 1 wherein a number of four of planar surface parts are provided along a circumference of said spike defining a cross-sectional shape with four straight sides inscribed in a square.

4. A filter apparatus according to claim 1 wherein said spike reduces in size in cross section toward a top free end thereof.

5. A filter apparatus according to claim 1 wherein said spike has planar surface parts tapering toward an end of said spike in a manner corresponding to tapering of interior surfaces of said dome defining said accommodating space.

6. A filter apparatus according to claim 1 wherein said shaft comprises a collar resting against said spike and securing said spike against axial movement thereof in a direction away from said filter element.

7. A filter apparatus according to claim 6 wherein a snap ring is disposed on said shaft and received in a groove in said central bore of said spike securing said spike against lifting-off axially from said shaft.

8. A filter apparatus according to claim 7 wherein said shaft is screwed into a sealable oil discharge opening in said filter housing.

9. A filter apparatus according to claim 8 wherein said shaft comprises an internal fluid path between an exterior of said collar and said oil discharge opening of said filter housing.

10. A filter apparatus according to claim 1 wherein planar surface parts extend along entire lengths of said dome and said spike, respectively.

11. A filter apparatus comprising:
a filter housing;
a filter element having an inner filter cavity enclosed by a filter medium and being received in said filter housing, said filter element having an opening at an end of said filter element and having a dome extending into said inner cavity, said dome having an accommodating space therein extending from said opening; and
an element holder being in said filter housing and interacting with said filter element when said filter element is in a functional position thereof in said filter housing, said element holder having a projecting accommodating spike with an outer configuration conforming to a non-circular shape of said opening and being received in said opening and conforming to a non-circular shape of said accommodating space and being received in said accommodating space securing said filter element to said element holder when said filter element is in the functional position thereof, said spike being rotatably supported in said filter housing about longitudinal axes of said filter housing and said filter element on a shaft disposed on said element holder, said shaft extending into a central bore of said spike.

12. A filter apparatus according to claim 11 wherein said dome is disposed on an end cap on an end of said filter element.

13. A filter apparatus according to claim 11 wherein planar surface parts are provided along an inner circumference of said dome defining a cross-sectional shape.

14. A filter apparatus according to claim 11 wherein said spike reduces in size in cross section toward a top free end thereof.

15. A filter apparatus according to claim 11 wherein said spike has planar surface parts tapering toward an end of said spike in a manner corresponding to interior surfaces of said dome.

16. A filter apparatus according to claim 15 wherein said planar surface parts extend along entire lengths of said spike.

17. A filter apparatus according to claim 15 wherein said shaft comprises a collar resting against said spike and securing said spike against axial movement thereof in a direction away from said filter element.

18. A filter apparatus according to claim 17 wherein a snap ring is disposed on said shaft and received in a groove in said central bore of said spike securing said spike against lifting-off axially from said shaft.

19. A filter apparatus according to claim 18 wherein said shaft is screwed into a sealable oil discharge opening in said filter housing.

20. A filter apparatus according to claim 19 wherein said shaft comprises an internal fluid path between an exterior of said collar and said oil discharge opening of said filter housing.

* * * * *